US012775546B1

(12) United States Patent
Santos et al.

(10) Patent No.: US 12,775,546 B1
(45) Date of Patent: Oct. 27, 2026

(54) AUTOMATED VALIDATION TESTING SYSTEM

(71) Applicant: Tractian Technologies Inc, Atlanta, GA (US)

(72) Inventors: Nicholas Santana Santos, São Paulo (BR); Davi Dantas Lopes, São Paulo (BR); Pedro Igor Aguiar, Recife (BR)

(73) Assignee: Tractian Technologies Inc, Atlanta, GA (US)

( * ) Notice: Subject to any disclaimer, the term of this patent is extended or adjusted under 35 U.S.C. 154(b) by 0 days.

(21) Appl. No.: 19/386,389

(22) Filed: Nov. 12, 2025

(51) Int. Cl.
*G06F 11/3668* (2025.01)
*G06F 11/07* (2006.01)

(52) U.S. Cl.
CPC ........ *G06F 11/3688* (2013.01); *G06F 11/079* (2013.01); *G06F 11/3692* (2013.01)

(58) Field of Classification Search
CPC . G06F 11/3688; G06F 11/079; G06F 11/3692
See application file for complete search history.

(56) References Cited

U.S. PATENT DOCUMENTS 9,213,537 B2 * 12/2015 Bandakka ........... G06F 11/1417
9,858,066 B2 * 1/2018 Landry ..................... G06F 8/65
11,126,385 B1 * 9/2021 Zakharov .............. G06F 3/1229
2017/0034023 A1 * 2/2017 Nickolov ............ H04L 43/0817

* cited by examiner

*Primary Examiner* — Tung S Lau
(74) *Attorney, Agent, or Firm* — Cognition IP, P.C.; Edward Steakley; Saleh Kaihani

(57) ABSTRACT

The system is designed to centralize all peripheral subsystems required for executing hardware, mechanical and firmware validation tests, providing a unified and intuitive interface for scripting test procedures that involve physical equipment. This centralized approach enables development teams to automate validation processes efficiently, reducing manual effort and human error. Additionally, the system facilitates resource management by handling equipment scheduling, coordinating test execution, and automatically generating structured test reports. These capabilities streamline the overall validation workflow and improve the traceability and repeatability of test activities.

20 Claims, 8 Drawing Sheets

FIG.
1

AUTOMATED VALIDATION TESTING SYSTEM

FIELD

The present invention relates generally to systems, tools, and methods to automate validation testing.

BACKGROUND

Testing of production hardware, software, configuration files, and firmware has traditionally been a time consuming and labor-intensive task. Shakers and other signal generators need to be set up for each test being run on each device being tested. Since there are numerous tests that need to be performed on each device, the repeated setup changes needed for a set of tests on single device results in an inefficient process and an increase in errors due to human error in the setup. The problem is compounded when the number of devices being tested increases.

The present invention solves the problem by creating an automated testing environment that can control the loading of configurations, firmware, testing recipes, instruction for signal generation, and the collection of data from the devices being tested, all from a remote location.

SUMMARY

The systems and methods described herein provide for the automation of validation testing of monitoring devices. In some embodiments, the system may comprise a testing controller, an input stimuli device, a target device, and a reference sensor. In some embodiments, there may be one or more input stimuli devices, one or more target devices and one or more reference sensors. In some embodiments, the target device may further comprise a testing sensor.

In some embodiments, the testing controller may be configured to receive a firmware package, wherein the firmware package may comprise a first firmware version. The testing controller may further receive a testing package, wherein the testing package may include a testing configuration and one or more test recipes. In some embodiments, each test recipe may comprise one or more specific tests.

In some embodiments, the test controller may be configured to start execution of a test recipe. The execution may comprise determining, by a device interface module, a second firmware version being run on the target device. The test controller may then verify that the first firmware version and the second firmware version are the same.

In some embodiments, the target device may then be added to the test configuration. A testing stimuli may then be generated by the input stimuli device. The reference sensor may then collect reference data resulting from the generated testing stimuli. The testing sensor may also collect testing data resulting from the generated testing stimuli.

In some embodiments, a comparison may then be performed between the reference data and the testing data and a status report generated corresponding to the comparison. In some embodiments, the generated status report and the firmware package may be returned to the user.

In some embodiments, the comparison may be based on one or more ranges of values corresponding to valid responses to specific tests in the test recipe.

In some embodiments, a comparison that falls outside of the one or more ranges of values may generate a failure status report. A failure status report may comprise an indication of the specific test that failed.

In some embodiments, the input stimuli device may be a shaker, oscillator, frequency analyzer, focus analyzer, power generator, or signal generator.

In some embodiments, the reference sensor may be a virtual sensor. The virtual sensor may be configured to simulate operation of a virtual target device that is the same model as the target device.

The appended claims may also serve as a summary of this application.

The features and components of these embodiments will be described in further detail in the description which follows. Additional features and advantages will also be set forth in the description which follows, and in part will be implicit from the description, or may be learned by the practice of the embodiments. The detailed description and specific examples are intended for illustration only and are not intended to limit the scope of the disclosure.

BRIEF DESCRIPTION OF THE DRAWINGS

The present disclosure will become better understood from the detailed description and the drawings, wherein.

DETAILED DESCRIPTION

Figure 1:
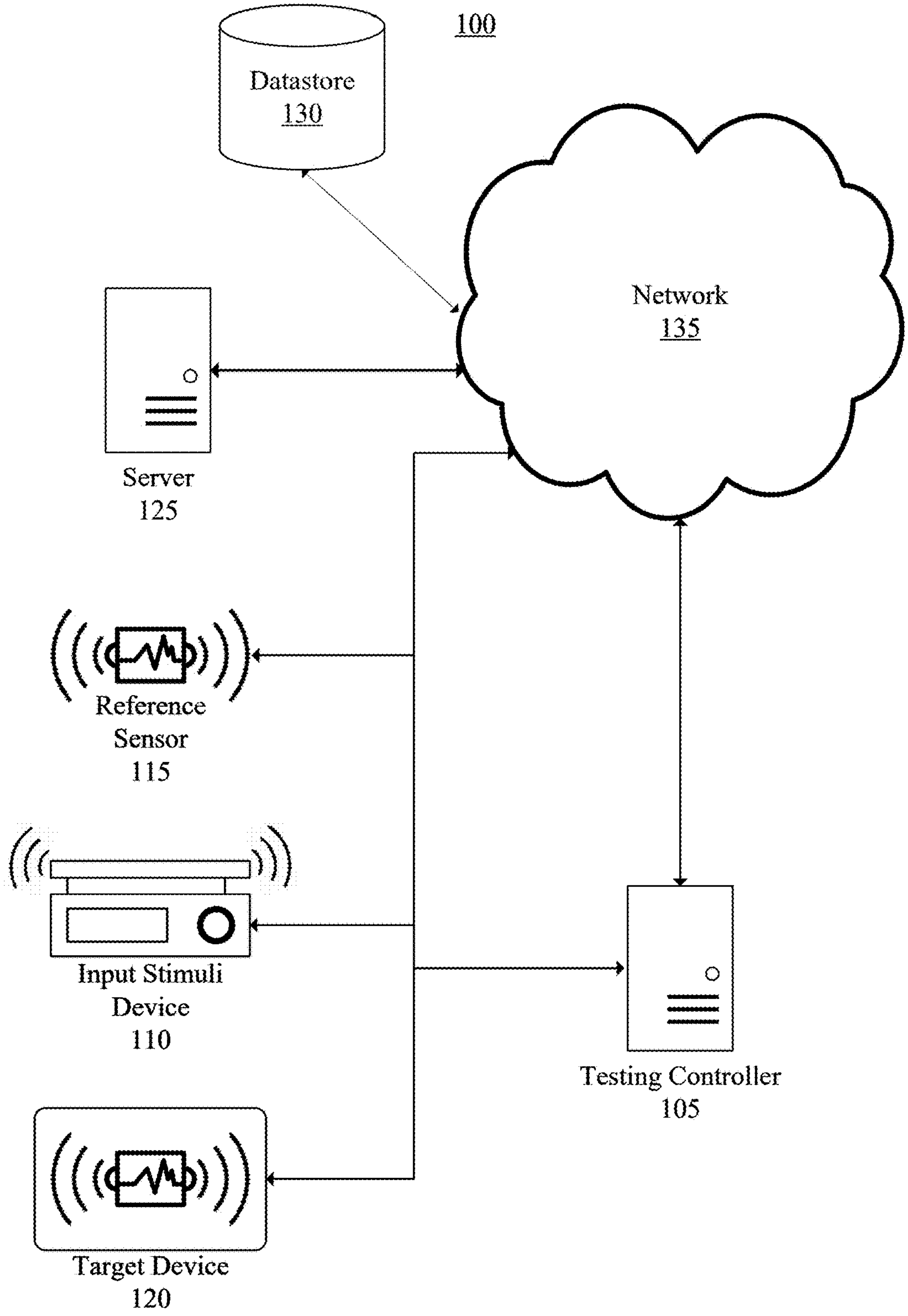
FIG. 1 is a diagram illustrating an automated testing system in which some embodiments may operate.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

The following generally relates to a system, device, and methods for performing automated validation testing of monitoring devices. In some embodiments, the system may be configured to centralize all peripheral subsystems required for executing hardware, mechanical and firmware validation tests. The system may provide a unified and intuitive interface for scripting test procedures that involve physical equipment.

This centralized approach enables development teams to automate validation processes efficiently, reducing manual effort and human error. Additionally, the system facilitates resource management by handling equipment scheduling, coordinating test execution, and automatically generating structured test reports. These capabilities streamline the overall validation workflow and improve the traceability and repeatability of test activities.

In some embodiments, the system may be configured to automate testing of a testing target ("target device"). In some embodiments, the testing target may be a mechanical or electrical system. The system may use one or more testing systems to perform one or more testing protocols or test recipes.

In some embodiments, one or more reference sensors, one or more target devices and one or more input stimuli devices may be connected or attached to one another. The connection/attachment may be direct or indirect. The input stimuli devices may be any device that generates a signal detectable by the one or more reference sensors and one or more target devices. The input stimuli device may be configured to generate mechanical, electrical, electromagnetic, and other signals to simulate operation of piece of equipment that the target device is to monitor. For example, the input stimuli devices may be devices such as shakers, oscilloscopes, frequency analyzers, focus analyzers, power generators, signal generators, or other laboratory/industrial equipment. Other physical equipment may be used in the automated testing system. In some embodiments, the system may be configured to control other physical equipment such as HVAC or other real-world systems that are in a production or testing environment.

In some embodiments, the system may be configured to perform validation of a target device without a reference device. The system may control a stimuli device to generate a message or signal and send it to the target device. The target device may then send a response, based on the received message or signal, to the testing system. The response may then be cross compared to the message or signal sent. The comparison may be made to an expected response to a signal. In some embodiments, the response may be validated if it is within a predetermined threshold of an expected value. In some embodiments, when a response does not match the message, signal or expected response, an alert may be generated to indicate the mismatch.

In some embodiments, the system may be configured to perform automated communication testing. The automated communication testing may be performed between the input stimuli device and the target device without a reference sensor. The input stimuli device may directly send signals, massages, or other types of input to the target device. Messages may be sent in a common communication protocol between the input stimuli device and the target device.

In some embodiments, a test recipe may be executed for a target device. The execution may be based on a received testing configuration and specific tests of a test recipe. The test recipe may include instructions to control the input stimuli device. The test recipe may comprise specific tests to be performed on the target device, and each test may correspond to a set of signals generated by the input stimuli device.

For example, a vibration test may be performed for a target device. The system may turn on a shaker or other vibration generation device and instruct the shaker to generate, based on the testing configuration, a 15 Hz sinusoidal waveform. The duration of the test may be specified in the specific test, and the shaker may be instructed to generate vibrations for said time, for example 3 hours. The reference sensor and the target device may record data corresponding to the sensed vibrations and send the data back to the system for analysis. The analysis may comprise comparing the reference sensor data and the target device data. In some embodiments, data associated with the shaker (input stimuli device) may also be used in the analysis. Acquisition statistics from the reference sensor and the target data device may also be used in the analysis.

In some embodiments, the execution of the test recipe may start with setting the configuration of the target device. The specific test may then be run and data collected for said test. Upon completion of the test and recording of the data, an analysis may then be performed. In some embodiments, more than one analysis may be performed in a single test. In some embodiments, the system may then generate a report based on the analysis. The report may comprise a status and information corresponding to the test performed, the configuration used, metrics used, metric values, sensor tested, protocols tested, functions tested, or other information related to the testing target.

In some embodiments, multiple tests may use the same configuration. For example, there may be a plurality of tests that require the same vibration frequency and waveform to be generated. The system may execute each test simultaneously while only needing to run the shaker a single time. For example, the shaker may run for a specified amount of time at a specified frequency and a specified waveform, and each of the tests may use the same data captured by the target device and the reference sensor during operation of the shaker. For example, a first test may use the data to perform statistical calculations such as RMS, peak-to-peak value, and peak value, and compare the reference sensor to the target device. A second test may be a raw waveform comparison, where the raw waveform of the reference sensor and the target device are compared.

In some embodiments, the configuration may comprise settings/or parameters corresponding to the operation of the one or more input stimuli devices, operation of the target devices, execution of the test recipes or combination thereof. In some embodiments, a master configuration file may include all said configurations. In some embodiments, an individual configuration file may be used for each of the input stimuli devices, target devices, and test recipes. In some embodiments, one or more combined configuration files may be used, wherein each combined configuration file comprises a shared configuration that is used between a plurality of input stimuli devices, target devices, or test recipes. In some embodiments, a combination of individual configuration files and combined configuration files may be used in the setup and execution of tests/test recipes.

In some embodiments, each specific test may have a script associated with it. This script may be executed to perform the test. In some embodiments, there may be more than one script for a specific test. In some embodiments, more than one target device may be tested simultaneously with a single input stimuli device.

In some embodiments, the system may be configured to record sensor readings from one or more source devices, wherein the source devices may be sensors that are deployed in a production environment. The system may use said recorded sensor readings in the creation of a test recipe. The input stimuli device may be controlled to simulate the operation of a real-world piece of equipment. This may be used for investigating failures of equipment or failures of the source device. In some embodiments, the test recipe may be generated based on an audio file such as a WAV file.

In some embodiments, the system may be configured to test compatibility between prior hardware and firmware versions of a target device. To test compatibility between two firmware versions, the system may force an OTA update from the older version to the newer version to test forward compatibility, and from the newer version to the older version to test reverse compatibility. After forcing the forward or backward update, the target device may perform a predefined set of tests or operations to validate operation after the update.

In some embodiments, a hardware compatibility test may be performed in a similar manner to that of the firmware compatibility test.

FIG. 1 is a diagram illustrating an exemplary automated testing system 100 in which some embodiments may operate.

The automated testing system 100 may comprise one or more testing controllers, one or more input stimuli devices 110, one or more reference sensors 115, one or more target devices 120, one or more servers 125, one or more datastores 130 and a network 135.

The testing controller 105 may be one or more physical or virtual machines configured to communicate with the one or more input stimuli devices 110, one or more reference sensors 115, one or more target devices 120, one or more servers 125 and one or more datastores 130 over network 135.

In some embodiments, testing controller 105 may communicate directly with input stimuli device 110, reference sensor 115, and/or target device 120. In some embodiments, testing controller 105 may send instruction for operation to input stimuli device 110. The instructions may be sent directly, or through network 135. Sensor data collected by reference sensor 115 and target device 120 may be retrieve by testing controller 105 directly or through network 135. In some embodiment, reference sensor 115 and target device 120 may send collected sensor data and operational information to server 125, where it may then be accessed by the testing controller 105.

The reference sensor 115 may be a physical or virtual sensor. In some embodiments, the reference sensor 115 may be a physical device that is configured to collect data corresponding to stimuli received from the input stimuli device 110. In some embodiments, the reference sensor 115 may be a virtual sensor configured to simulate operation of a physical sensor monitoring the input stimuli device 110. The simulation may directly generate virtual sensor data based on operation of the input stimuli device, control signals sent to the input stimuli device from the testing controller, status of the input stimuli device, testing configuration of the virtual sensor and other system variables. In some embodiments, the virtual sensor may be run as software or and interface within the testing controller 105.

In some embodiments, the reference sensor 115 may be configured to collect sensor data from a physical sensor and generate a virtual sensor based on said data. The virtual sensor may be configured to simulate the target device 120, allowing for a direct comparison between the virtual sensor data and the data collected by the target device 120 as a result of testing. The virtual sensor simulation may be of a similar device, such as a comparable model to the target device, an older or newer model of the target device or the same model.

The servers 125 may be one or more physical or virtual machines configured to communicate with the one or more testing controllers 105, one or more input stimuli devices 110, one or more reference sensors 115, one or more target devices 120 and one or more datastores 130. The one or more servers 125 may be configured as a distributed computing infrastructure.

Datastores 130 may communicate with one another over network 135. Datastores 130 may be any storage device capable of storing data for processing or as a result of processing information at the one or more testing controllers 105, one or more input stimuli devices 110, one or more reference sensors 115, one or more target devices 120 or one or more servers 125. The datastores 130 may be a separate device or the same device as server 125. The datastores 130 may be located in the same location as that of servers 125, or at separate locations.

Network 135 may be an intranet, internet, mesh, LTE, GSM, peer-to-peer, or other communication network that allows the one or more testing controllers 105, one or more input stimuli devices 110, one or more reference sensors 115, one or more target devices 120, one or more servers 125 and one or more datastores 130 to communicate with one another.

Figure 2:
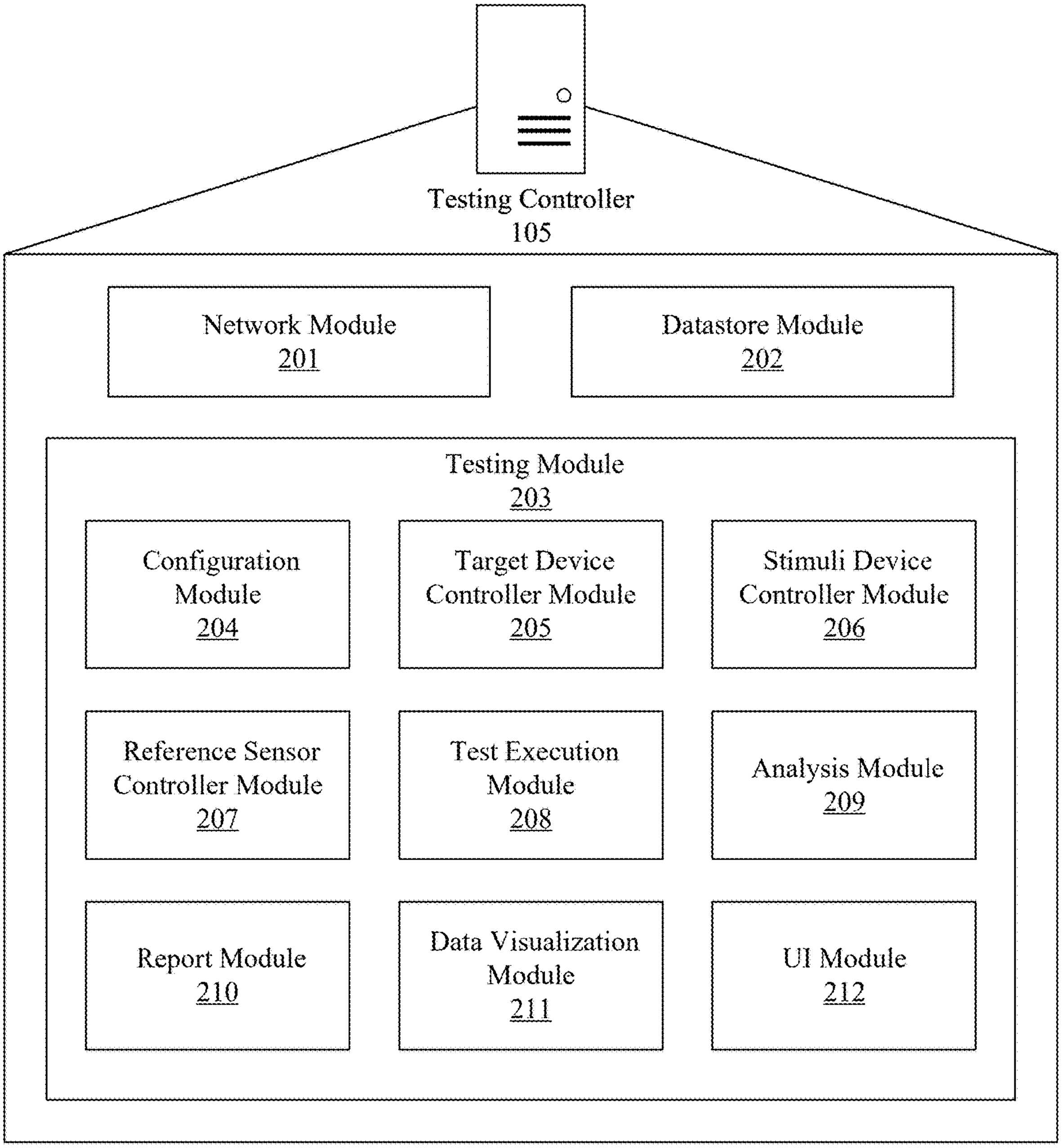
FIG. 2 is a diagram illustrating an exemplary testing controller device in accordance with aspects of the present disclosure.

FIG. 2 is a diagram illustrating an exemplary testing controller 105 in accordance with aspects of the present disclosure. Testing controller 105 may comprise a network module 201, a datastore module 202 and testing module 203.

Network module 201 may transmit and receive data from other computing systems via a network such as network 135 as described above with regard to FIG. 1. In some embodiments, the network module 201 may enable transmitting and receiving data from the Internet. Data received by the network module 201 may be used by the other modules. The modules may transmit data through the network module 201.

The datastore module 202 may be configured to store information generated by the one or more modules operating on the testing controller 105. The one or more modules operating on the testing controller 105 may also retrieve information from the datastore module 202. Datastore module 202 may also be configured to receive and store information received over network module 201.

Testing module 203 may comprise configuration module 204, target device controller module 205, stimuli device controller module 206, reference sensor controller module 207, test execution module 208, analysis module 209, report module 210, data visualization module 211 and UI module 212. In some embodiments, testing module 203 may be configured to perform testing of any device and firmware combination. In some embodiments, the testing module 203 may perform one or more checks to make sure that the hardware and firmware are production versions. Testing of non-production versions of hardware and firmware would not provide a high level of assurance that the device will operate as desired in real life as the hardware or firmware may have changed between testing and delivery to the client. By performing the testing on production versions, functionality may be guaranteed when deployed.

The configuration module 204, may receive a testing configuration for one or more test recipes and for one or more target devices. The testing configuration may also include testing requirements such as hardware models and versions, firmware versions, software packages and versions, and other information that affects operation of the device. The system may use the testing requirements to check that a target device matches the testing requirements before any testing procedures may be initiated.

In some embodiments, the configuration module 204 may be configured to receive a new or updated firmware package for a target device or an updated bill-of-materials for said device. The system may then analyze the new/updated firmware package and identify changes to the functionality of the device based on the modifications made. In some embodiments, the analysis may be configured to identify intended functionality changes as well as any functions that share dependencies with, or depend from the modified functions. Test recipes may be automatically selected based on the analysis and each of the identified functionalities may be validated by executing the selected test recipes.

The target device controller module 205 may be configured to control operation of the one or more target devices, collect data from said devices, modify settings in said devices and update, or change the firmware of said devices. In some embodiments, the target device controller module 205 may provide operational instructions to the one or more target devices based on the test recipe being executed.

The stimuli device controller module 206 may be configured to control the operation of the one or more stimuli devices. Each stimuli device may be controlled independently. In some embodiments, an interface may be generated for each stimuli device, allowing for control and data collection. In some embodiments, the stimuli device controller module 206 may receive instructions for controlling one or more stimuli devices from the test execution module 208. Control of the one or more stimuli devices may also be based on the configuration information associated with the target device being tested.

The reference sensor controller module 207 may be configured to collect sensor data from a physical sensor and generate virtual sensor data. The virtual sensor data may be sent to the analysis module 209 for comparison and analysis. In some embodiments, the raw sensor data may also be collected and sent to the analysis module for analysis. In some embodiments, the reference sensor controller module 207 may be configured to generate synthetic sensor data based on the test being run and the instructions sent to the stimuli devices to generate signals. The synthetic data may also be based on a simulation of the stimuli device being operated according to the test recipe.

The test execution module 208 may be configured to schedule and initiate execution of test recipes. Based on one or more test recipes or individual test scripts in a test recipe, the test execution module 208 may coordinate the controlling of stimuli devices through the stimuli device controller 206, collecting of sampling data from the target device through the target device controller module 205, collecting of sampling data or synthetic data from the reference sensor through the controller module 207, and the analysis of the collected data through the analysis module 209.

The analysis module 209 may use raw or processed data from the target device and/or the reference sensor to carry out the analysis. In some embodiments, one or more statistical analyses may be used to validate the results of the test being performed. In some embodiments, the analysis module 209 may perform a plurality of analyses on the collected data at the same time. The plurality of analyses may be a suit of calculations for a single test, or a plurality of tests each with one or more calculations being performed during the analysis.

The report module 210 may be configured to generate a structured report document for each performed test. The report document may comprise a status of the test and information associated with the execution and results of the test.

The data visualization module 211, may be configured to generate images, graphs, test evidences, or other graphical representations of data collected from the target devices and/or reference devices. In some embodiments, the visualizations may be based on raw data or analysis of the collected data. In some embodiments, visualizations may be generated for the analysis module 210 to use in the analysis or based on results of the analysis.

The UI module 212 may be configured to provide a graphical user interface for monitoring and managing the operation of the one or more stimuli devices, one or more target devices and one or more reference sensors. The UI module 212 may also allow users to create, edit, or add test recipes, configurations, or scripts.

Figure 3:
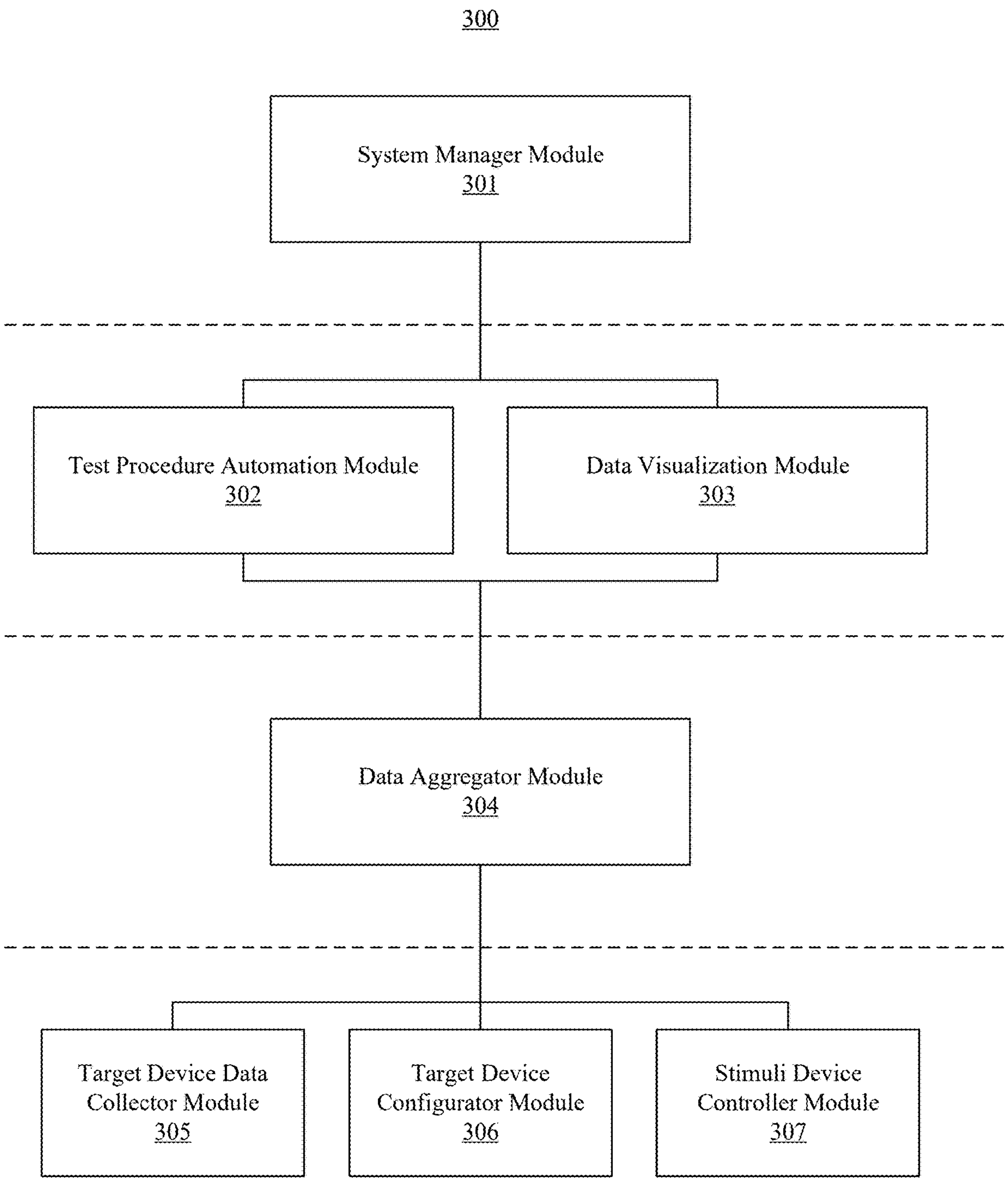
FIG. 3 is a diagram illustrating an exemplary testing framework in accordance with aspects of the present disclosure.

FIG. 3 is a diagram illustrating an exemplary testing framework 300 in accordance with aspects of the present disclosure. The testing framework 300 may comprise a system manager module 301, a test procedure automation module 302, a data visualization module 303, a data aggregator module 304, a target device data collector module 305, a target device configurator module 306 and a stimuli device controller module 307.

In some embodiments, the system manager module 301 may be configured to provide a user interface to one or more users of the system. The system module 301, may be configured to show the to show the status of the input stimuli devices, reference sensors, and target devices. Through the system manager module 301, execution of test recipes may be initiated or scheduled for execution at a later time. In some embodiments, a queue of execution may be maintained to facilitate execution of multiple test recipes. In some embodiments, new configurations and tests may be generated or added to the system. In some embodiments, a user may edit or modify existing configurations and tests through the system manager module 301.

In some embodiments, test procedure automation module 302 may be configured to execute one or more test procedures. The test procedure automation module 302 may be configured to control one or more input stimuli devices and one or more target devices. Each test procedure may comprise a set of instructions to control the input stimuli devices and target devices.

In some embodiments, data visualization module 303 may be configured to generate images, graphs, test evidences, or other graphical representations of data collected from the target devices and/or reference devices. In some embodiments, the visualizations may be based on raw data or analysis of the collected data.

In some embodiments, data aggregator module 304 may be configured to facilitate the collection of data from the reference sensors, target devices, and input stimuli devices.

The target device data collector module 305 may be configured to communicate with and retrieve data from the one or more target devices. In some embodiments, the target device data collector module 305 may collect status, logs, times, meter, diagnostics, samples, and other data generated by the target device, both during and after execution of a test.

The target device configurator module 306 may be configured to modify configurations of the target device. Commands and OTA functions may also be controlled by target device configurator module 306.

The stimuli device controller module 307 may be configured to manage the operation of the one or more input stimuli devices. Instructions to perform operations according to the test procedure may be sent to the one or more input stimuli devices. The stimuli device controller module 307 may also monitor the state of the one or more input stimuli devices during execution of a test.

Figure 4A:
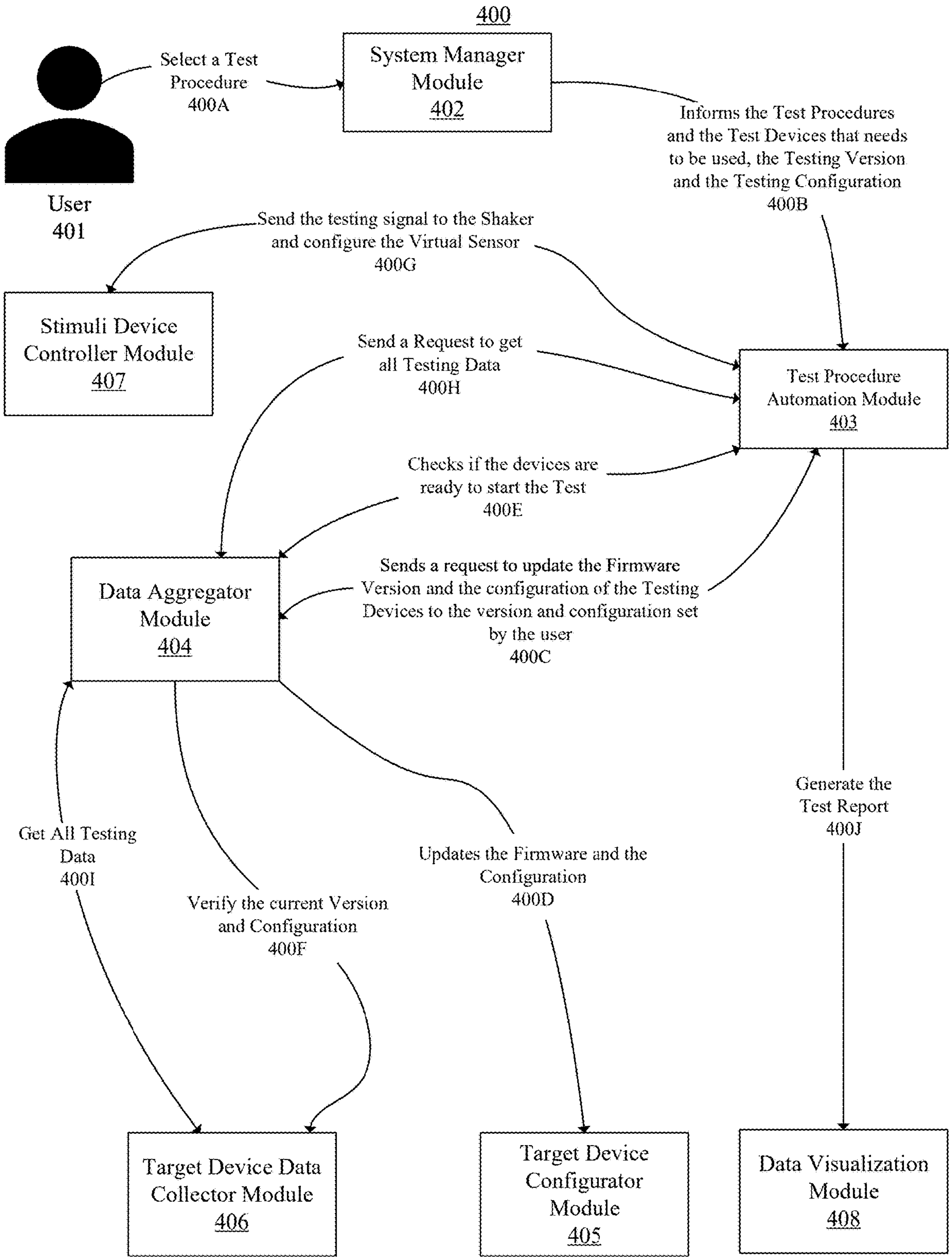
FIG. 4A is a diagram illustrating exemplary testing procedures in accordance with aspects of the present disclosure.

FIG. 4A is a diagram illustrating an exemplary testing procedure 400 that may be performed in accordance with some embodiments. In some embodiments, the testing procedure may start with step 400A, where a user 401 selects a test procedure. In some embodiments, one or more other systems may be configured to perform the selection of test procedures. The selection of the test procedure may be transmitted to a System Manager Module 402. In some embodiments, the System Manager Module 402 may provide the user with an interface to make the selection.

At step 400B, the System Manager Module 402 may send test procedure information to the Test Procedures Automation Module 403. The test procedure information may comprise the test device that needs to be used, the testing version and the testing configuration.

At step 400C, the Testing Procedure Automation Module 403 may send, through the Data Aggregator Module 404, a request to update the firmware version and the configuration of the testing devices to the version and configuration set by the user.

At step 400D, the Data Aggregator Module 404, may send or forward the request to update the firmware and the configuration to the Target Device Configuration Module 405. The Target Device Configuration Module 405 may then perform said firmware and configuration update on the selected target device.

For example, the Target Device Configuration Module 405 may receive a device ID and one or more parameters to modify for the device associated with said device ID. The current configuration loaded in the device may be retrieved from said device, a datastore of saved device configurations, or a device configuration stored locally. The Target Device Configuration Module 405 may then perform a modification procedure, wherein the received parameter modifications replace existing parameters and/or add new parameters to the configuration. In some embodiments, removal of a parameter may not be permitted. The Target Device may then be reconfigured with the modified configuration.

In some embodiments, each updated or modified configuration loaded on the Target Device may be versioned in a version control system or other logging system. In some embodiments, the versions may be incremented for every test run.

At step 400E, the Test Procedure Automation Module 403 may then check if the target devices are ready to start the test. This check may be performed by sending a request to the Data Aggregator Module 404.

At step 400F, the Data Aggregator Module 404 may send, to the Target Device Data Collector Module 406, a request to verify the current version and configuration. In some embodiments, the Target Device Data Collector Module 406 may perform the verification of the version and configuration by querying the target device. In some embodiments, the verification may be performed from data already collected from the target device. After verifying the current version and configuration of the target device, the Test Procedure Automation Module may start the test.

At step 400G, the Test Procedure Automation Module 403 may send the testing signal and a virtual sensor configuration to the Stimuli Device Controller Module 407. The Stimuli Device Controller Module 407 may update the virtual sensor with the received virtual sensor configuration and begin control of the stimuli device (shaker) using the received testing signal.

At step 400H, the Test Procedure Automation Module 403 may send a request to the Data Aggregator Module 404 to get all the testing data.

At step 400I, the Data Aggregator Module 404 may retrieve all the testing data through the Target Device Data Collector Module 406. In some embodiments, the Target Device Data Collector Module 406 may be configured to collect raw data from one or more target devices. The Target Device Data Collector Module 406 may send said raw data to the Data Aggregator Module 404 as a real-time stream, delayed or buffered stream, or at regular intervals. In some embodiments, the Target Device Data Collector Module 406 may receive data that is preprocessed by the target device. In some embodiments, the Target Device Data Collector Module 406 may be configured to perform filtering, compression, or other preprocessing operations on the collected raw data. The filtered, compressed and/or preprocessed data may then be sent as a real-time stream, delayed or buffered stream, or at regular intervals. The Data Aggregator Module 404 may then send the data received from the Target Device Collector Module 406 to the Test Procedure Automation Module 403.

At step 400J, the Test Procedure Automation Module 403 may then generate or initiate generation of a test report based on the data received from the Data Aggregator Module 404. In some embodiments, the Data Visualization Module 408 may generate graphical representation of the data received from the Data Aggregator Module 404 and/or the report generated from said received data.

Figure 4B:
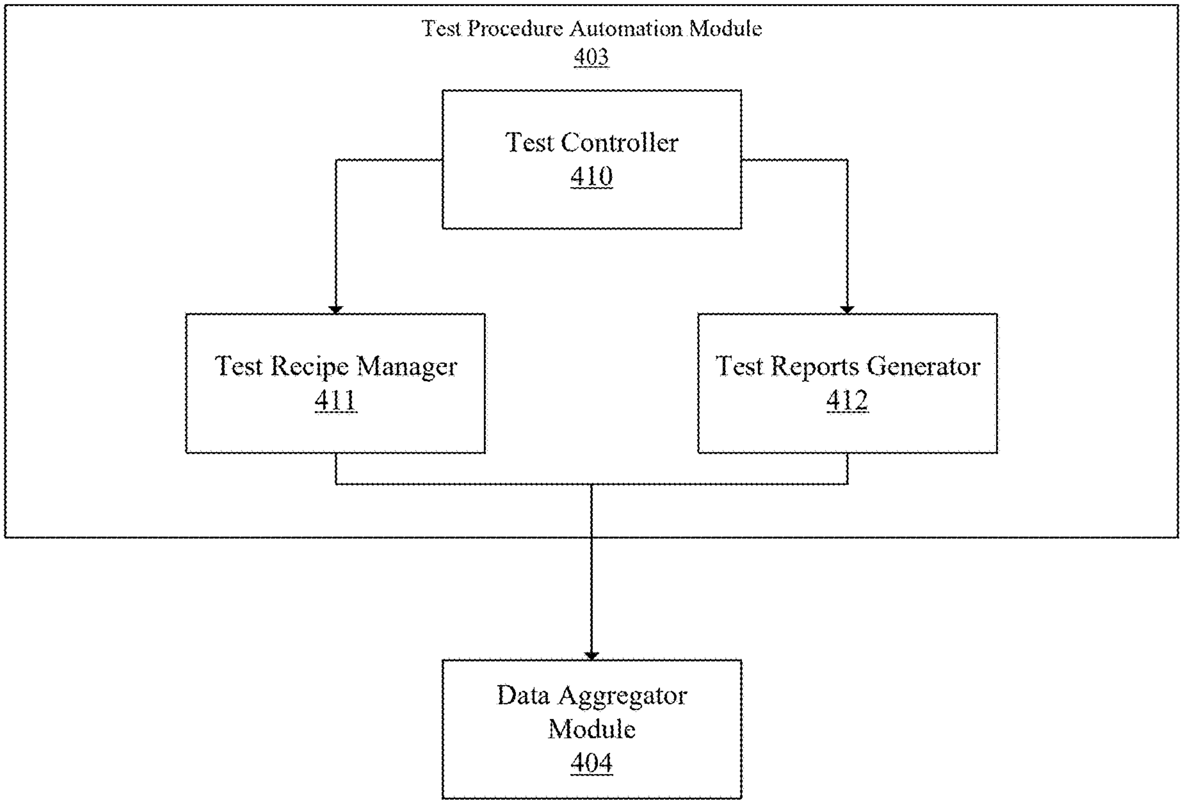
FIG. 4B is a diagram illustrating exemplary testing procedures in accordance with aspects of the present disclosure.

FIG. 4B is a diagram illustrating an exemplary testing procedure carried out in the Test Procedure Automation Module 403 that may be performed in accordance with some embodiments. The Test Procedure Automation Module 403 may comprise a Test Controller 410, a Test Recipe Manager 411 and a Test Reports Generator 412.

In some embodiments, the Test Controller 410 and Test Recipe Manager 411 may communicate directly with the Data Aggregator Module 404. In some embodiments, the Data Aggregator Module 404 may be integrated into the Test Procedure Automation Module 403.

The Test Controller 410 may be configured to manage operations of the Test Recipe Manager 411, the Test Reports Generator 412, and the Data Aggregator Module 404.

The Test Recipe Manager 411 may be configured to receive test recipes or a selection of a test recipe from a user. Each test recipe may be specific to the stimuli device (signal generation device).

Figure 5:
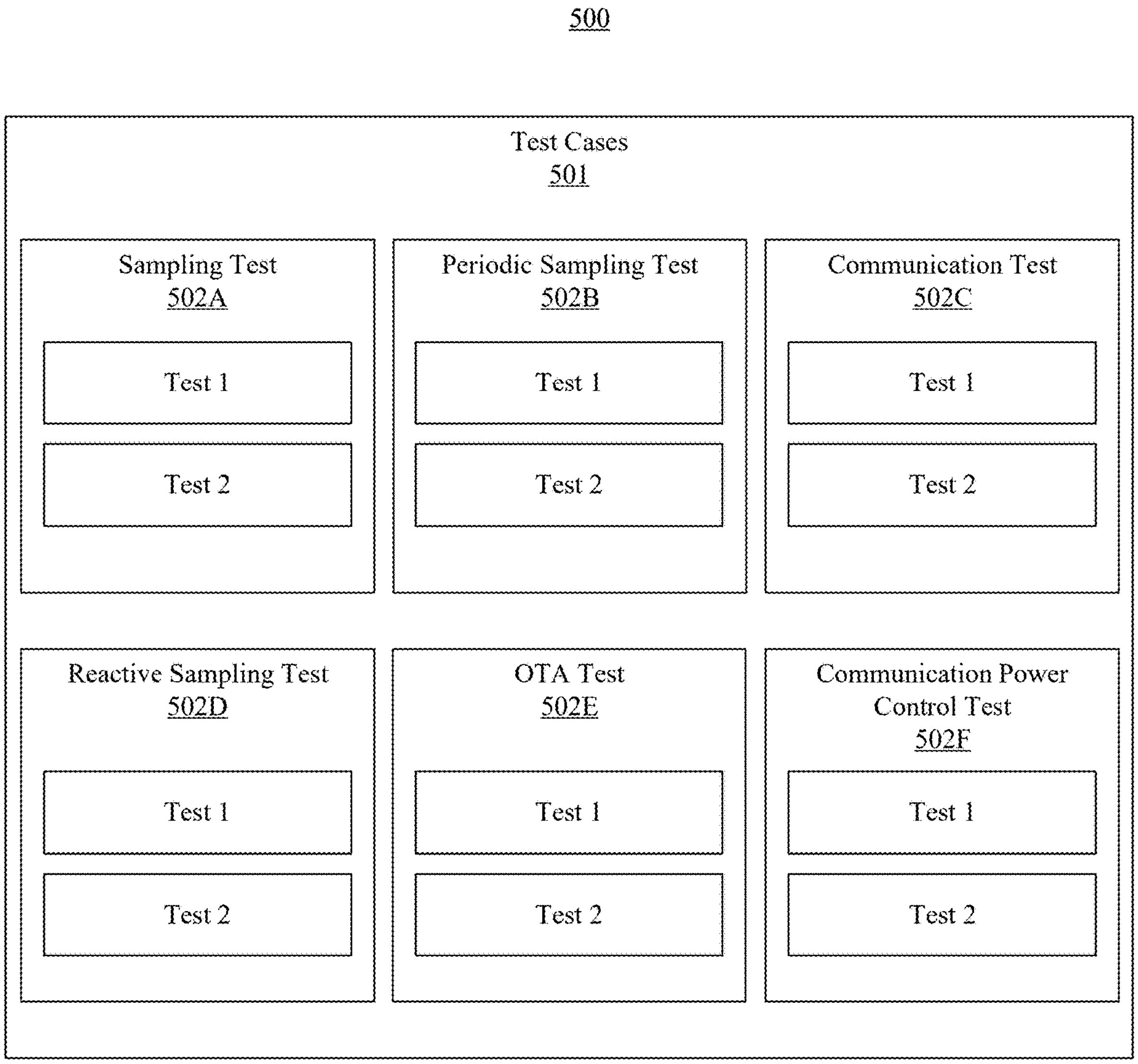
FIG. 5 is a diagram illustrating exemplary test cases in accordance with aspects of the present disclosure.

FIG. 5 is a diagram illustrating exemplary test cases in accordance with aspects of the present disclosure. The diagram shows a plurality of test cases 501, wherein each test case 502A-502F have two tests within. In some embodiments, the test cases may be the same as test recipes as discussed previously. Each test may be individually selected for execution, or the entire test case may be selected.

Figure 6:
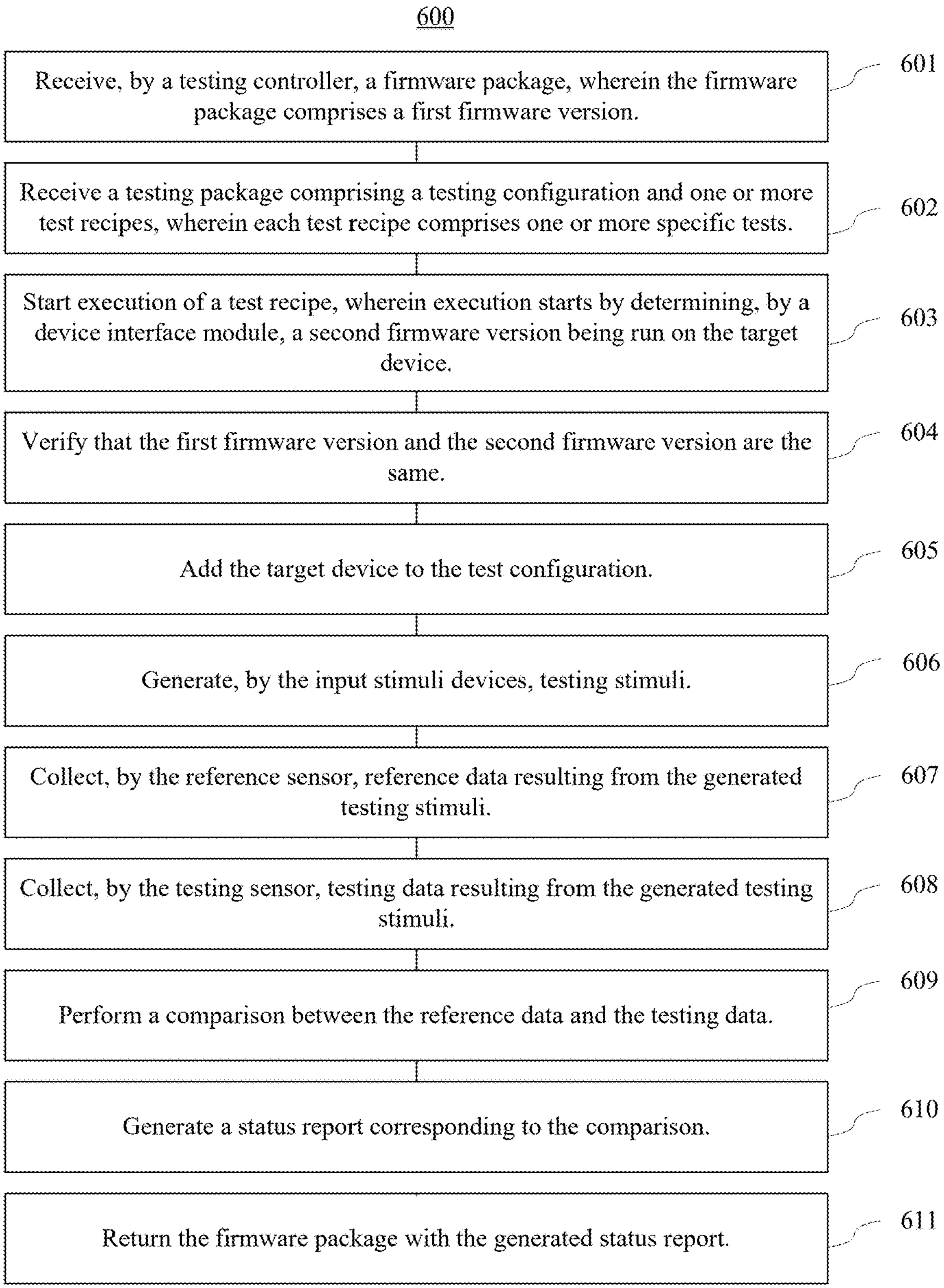
FIG. 6 is a flow chart illustrating an exemplary method that may be performed in accordance with some embodiments.

FIG. 6 is a flow chart illustrating an exemplary method 600 that may be performed in accordance with some embodiments.

At step 601, the system may be configured to receive, by a testing controller, a firmware package, wherein the firmware package comprises a first firmware version.

At step 602, the system may be configured to receive a testing package comprising a testing configuration and one or more test recipes, wherein each test recipe comprises one or more specific tests.

At step 603, the system may be configured to start execution of a test recipe, wherein execution starts by determining, by a device interface module, a second firmware version being run on the target device.

At step 604, the system may be configured to verify that the first firmware version and the second firmware version are the same.

At step 605, the system may be configured to add the target device to the test configuration.

At step 606, the system may be configured to generate, by the input stimuli devices, testing stimuli.

At step 607, the system may be configured to collect, by the reference sensor, reference data resulting from the generated testing stimuli.

At step 608, the system may be configured to collect, by the testing sensor, testing data resulting from the generated testing stimuli.

At step 609, the system may be configured to perform a comparison between the reference data and the testing data.

At step 610, the system may be configured to generate a status report corresponding to the comparison.

At step 611, the system may be configured to return the firmware package with the generated status report.

Figure 7:
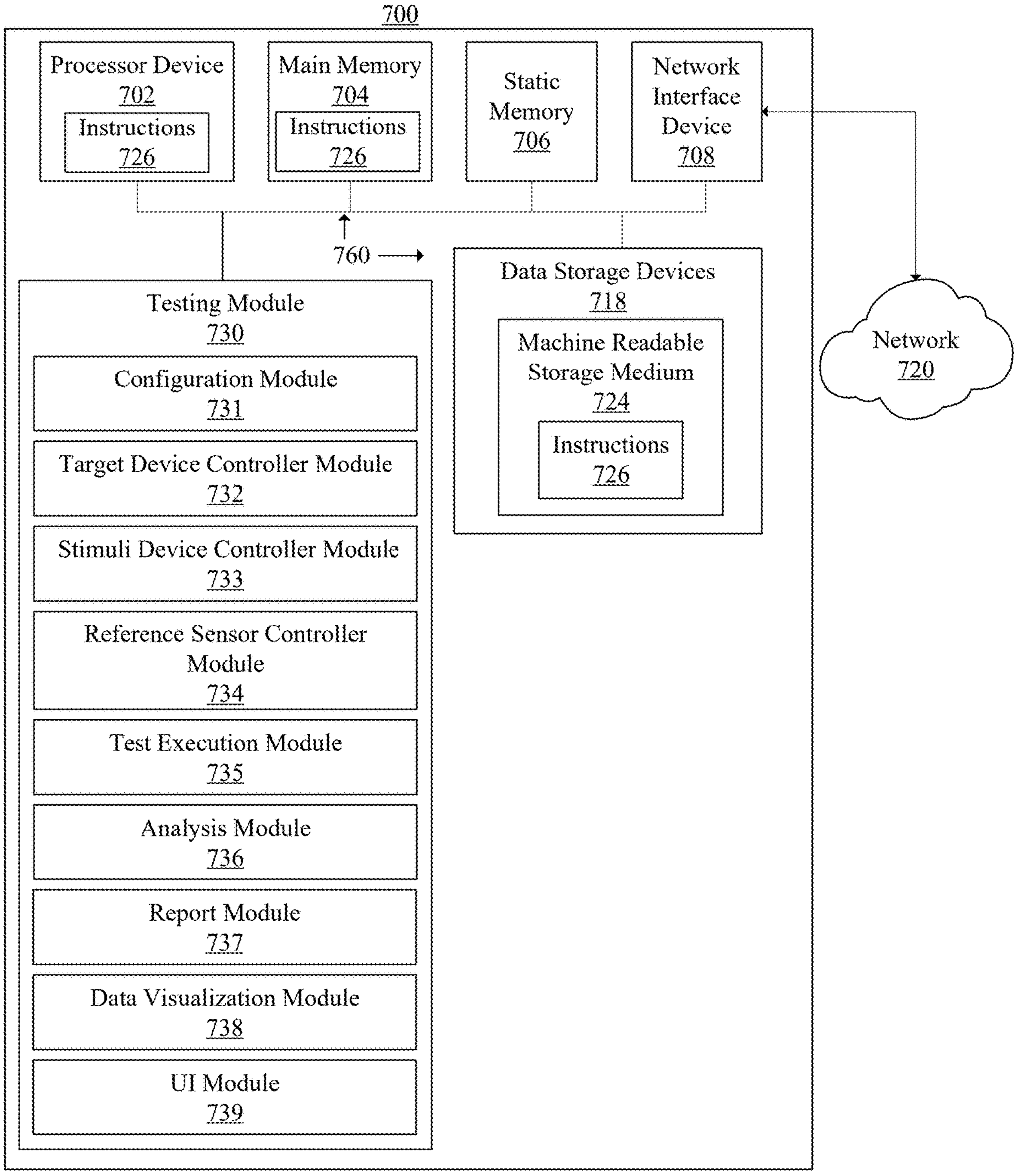
FIG. 7 is a diagram illustrating an exemplary computer/control system that may perform processing in some embodiments and in accordance with aspects of the present disclosure.

FIG. 7 illustrates an example machine of a computer system within which a set of instructions, for causing the machine to perform any one or more of the methodologies discussed herein, may be executed. In alternative implementations, the machine may be connected (e.g., networked) to other machines in a LAN, an intranet, an extranet, an ad-hoc network, a mesh network, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage device 718, which communicate with each other via a bus 760.

Processing device 702 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 702 is configured to execute instructions 726 for performing the operations and steps discussed herein.

The computer system 700 may further include a network interface device 708 to communicate over the network 720.

The computer system 700 may also include testing module 730, target device controller module 731, stimuli device controller module 732, reference sensor controller module 733, test execution module 734, analysis module 735, report module 736, data visualization module 737 and UI module 738.

Testing module 730, configuration module 731, target device controller module 732, stimuli device controller module 733, reference sensor controller module 734, test execution module 735, analysis module 736, report module 737, data visualization module 738 and UI module 739 may be the same or similar to that of testing module 203, configuration module 204, target device controller module 205, stimuli device controller module 206, reference sensor controller module 207, test execution module 208, analysis module 209, report module 210, data visualization module 211 and UI module 212 as disclosed in FIG. 2.

The data storage device 718 may include a machine-readable storage medium 724 (also known as a computer-readable medium) on which is stored one or more sets of instructions or software 726 embodying any one or more of the methodologies or functions described herein. The instructions 726 may also reside, completely or at least partially, within the main memory 704 and/or within the processing device 702 during execution thereof by the computer system 700, the main memory 704 and the processing device 702 also constituting machine-readable storage media. Information, including data used in the processes and methods of the system and the one or more sets of instructions or software, may also be stored in blockchain, as NFTs or other decentralized technologies.

In one implementation, the instructions 726 include instructions to implement functionality corresponding to the components of a device to perform the disclosure herein. While the machine-readable storage medium 724 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

It will be appreciated that the present disclosure may include any one and up to all of the following examples.

Example 1. A system for automating testing of monitoring devices, the system comprising: a testing controller; an input stimuli device; a target device, wherein the target device comprises a testing sensor; and reference sensor; and wherein the testing controller is configured to: receive a firmware package, wherein the firmware package comprises a first firmware version; receive, a testing package, wherein the testing package comprises: a testing configuration; and one or more test recipes, wherein each test recipe comprises one or more specific tests; start execution of a test recipe, wherein the execution comprises: determining, by a device interface module, a second firmware version being run on the target device; verifying that the first firmware version and the second firmware version are the same; adding, to the test configuration, the target device; generating, by the input stimuli devices, testing stimuli; collecting, by the reference sensor, reference data resulting from the generated testing stimuli; collecting, by the testing sensor, testing data resulting from the generated testing stimuli; and performing a comparison between the reference data and the testing data; generating a status report corresponding to the comparison; and returning the firmware package with the generated status report.

Example 2. The System of Example 1, wherein the comparison is based on one or more ranges of values corresponding to valid responses to specific tests in the test recipe.

Example 3. The System of any one of Examples 1-2, wherein a comparison that falls outside of the one or more range of values generates a failure status report, and wherein a failure status report comprises an indication of the specific test that failed.

Example 4. The System of any one of Examples 1-3, wherein the input stimuli device is a shaker, oscillator, frequency analyzer, focus analyzer, power generator, or signal generator.

Example 5. The System of any one of Examples 1-4, wherein the reference sensor is a virtual sensor and wherein the virtual sensor is configured to simulate operation of a virtual target device that is the same model as the target device.

Example 6. A method for automated validation testing, the method comprising: receiving, at a testing controller, a firmware package, wherein the firmware package comprises a first firmware version; receiving, a testing package, wherein the testing package comprises: a testing configuration; and one or more test recipes, wherein each test recipe comprises one or more specific tests; starting execution of a test recipe, wherein the execution comprises: determining, by a device interface module, a second firmware version being run on the target device; verifying that the first firmware version and the second firmware version are the same; adding, to the test configuration, the target device; generating, by the input stimuli devices, testing stimuli; collecting, by the reference sensor, reference data resulting from the generated testing stimuli; collecting, by the testing sensor, testing data resulting from the generated testing stimuli; performing a comparison between the reference data and the testing data; generating a status report corresponding to the comparison; and returning the firmware package with the generated status report.

Example 7. The Method of Example 6, wherein the comparison is based on one or more ranges of values corresponding to valid responses to specific tests in the test recipe.

Example 8. The Method of any one of Examples 6-7, wherein a comparison that falls outside of the one or more range of values generates a failure status report, and wherein a failure status report comprises an indication of the specific test that failed.

Example 9. The Method of any one of Examples 6-8, wherein the input stimuli device is a shaker, oscillator, frequency analyzer, focus analyzer, power generator, or signal generator.

Example 10. The Method of any one of Examples 6-9, wherein the reference sensor is a virtual sensor and wherein the virtual sensor is configured to simulate operation of a virtual target device that is the same model as the target device.

Example 11. One or more non-transitory computer-readable media storing computer-executable instructions that, when executed by one or more processors of a system for automating testing of monitoring devices, cause the one or more processors to: receive, at a testing controller, a firmware package, wherein the firmware package comprises a first firmware version; receive, a testing package, wherein the testing package comprises: a testing configuration; and one or more test recipes, wherein each test recipe comprises one or more specific tests; and start execution of a test recipe, wherein the execution comprises: determining, by a device interface module, a second firmware version being run on the target device; verifying that the first firmware version and the second firmware version are the same; adding, to the test configuration, the target device; generating, by the input stimuli devices, testing stimuli; collecting, by the reference sensor, reference data resulting from the generated testing stimuli; collecting, by the testing sensor, testing data resulting from the generated testing stimuli; performing a comparison between the reference data and the testing data; generating a status report corresponding to the comparison; and returning the firmware package with the generated status report.

Example 12. The non-transitory computer-readable media of Example 11, wherein the comparison is based on one or more ranges of values corresponding to valid responses to specific tests in the test recipe.

Example 13. The non-transitory computer-readable media of any one of Examples 11-12, wherein a comparison that falls outside of the one or more range of values generates a failure status report, and wherein a failure status report comprises an indication of the specific test that failed.

Example 14. The non-transitory computer-readable media of any one of Examples 11-13, wherein the input stimuli device is a shaker, oscillator, frequency analyzer, focus analyzer, power generator, or signal generator.

Example 15. The non-transitory computer-readable media of any one of Examples 11-14, wherein the reference sensor is a virtual sensor and wherein the virtual sensor is configured to simulate operation of a virtual target device that is the same model as the target device.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A system for automating testing of monitoring devices, the system comprising:

a testing controller;

an input stimuli device;

a target device, wherein the target device comprises a testing sensor; and a reference sensor; and wherein the testing controller is configured to:

receive a firmware package, wherein the firmware package comprises a first firmware version;

receive, a testing package, wherein the testing package comprises:

a testing configuration; and one or more test recipes, wherein each test recipe comprises one or more specific tests;

start execution of a test recipe, wherein the execution comprises:

determining, by a device interface module, a second firmware version being run on the target device;

verifying that the first firmware version and the second firmware version are the same;

adding, to the test configuration, the target device;

generating, by the input stimuli device, testing stimuli, the testing stimuli comprising one or more of a mechanical, electrical and electromagnetic signal, simulating operation of an equipment the target device is configured to monitor;

collecting, by the reference sensor, reference data resulting from the generated testing stimuli;

collecting, by a testing sensor, testing data resulting from the generated testing stimuli;

performing a comparison between the reference data and the testing data;

generating a status report corresponding to the comparison;

returning the firmware package with the generated status report;

controlling the input stimuli, simulating operations of the equipment;

determining failures of the equipment, based on the simulating; and a target device controller, remotely modifying the firmware of the target device, comprising providing operational instructions to the target device, based on the execution of the test recipes, wherein the reference sensor comprises a physical sensor co-located with the target device and configured to collect sensor data in response to mechanical, electrical or electromagnetic stimuli generated by the input stimuli device.

2. The system of claim 1, wherein the comparison is based on one or more ranges of values corresponding to valid responses to specific tests in the test recipe.

3. The system of claim 2, wherein a comparison that falls outside of the one or more range of values generates a failure status report, and wherein a failure status report comprises an indication of the specific test that failed.

4. The system of claim 1, wherein the input stimuli device comprises a shaker, oscillator, frequency analyzer, focus analyzer, power generator, or signal generator.

5. The system of claim 1, wherein the reference sensor comprises a virtual sensor and wherein the virtual sensor is configured to simulate operation of a virtual target device that is the same model as the target device.

6. A method for automated validation testing, the method comprising:

receiving, at a testing controller, a firmware package, wherein the firmware package comprises a first firmware version;

receiving, a testing package, wherein the testing package comprises:

a testing configuration; and one or more test recipes, wherein each test recipe comprises one or more specific tests;

starting execution of a test recipe, wherein the execution comprises:

determining, by a device interface module, a second firmware version being run on the target device;

verifying that the first firmware version and the second firmware version are the same;

adding, to the test configuration, the target device;

generating, by the input stimuli device, testing stimuli, the testing stimuli comprising one or more of a mechanical, electrical and electromagnetic signal, simulating operation of an equipment the target device is configured to monitor;

collecting, by the reference sensor, reference data resulting from the generated testing stimuli;

collecting, by a testing sensor, testing data resulting from the generated testing stimuli;

performing a comparison between the reference data and the testing data;

generating a status report corresponding to the comparison;

returning the firmware package with the generated status report;

controlling the input stimuli, simulating operations of the equipment;

determining failures of the equipment, based on the simulating; and a target device controller, remotely modifying the firmware of the target device, comprising providing operational instructions to the target device, based on the execution of the test recipes, wherein the reference sensor comprises a physical sensor co-located with the target device and configured to collect sensor data in response to mechanical, electrical or electromagnetic stimuli generated by the input stimuli device.

7. The method of claim 6, wherein the comparison is based on one or more ranges of values corresponding to valid responses to specific tests in the test recipe.

8. The method of claim 7, wherein a comparison that falls outside of the one or more range of values generates a failure status report, and wherein a failure status report comprises an indication of the specific test that failed.

9. The method of claim 6, wherein the input stimuli device comprises a shaker, oscillator, frequency analyzer, focus analyzer, power generator, or signal generator.

10. The method of claim 6, wherein the reference sensor is comprises virtual sensor and wherein the virtual sensor is configured to simulate operation of a virtual target device that is the same model as the target device.

11. The method of claim 6, wherein the input stimuli device comprises a physical device configured to generate mechanical vibrations or electrical signals applied to the target device.

12. The method of claim 6, further comprising the testing controller conditioning an initiation of execution of a test recipe by verifying a firmware version running on the target device matching a first firmware version of the received firmware package.

13. The method of claim 6, further comprising:

generating a virtual sensor; and the virtual sensor generating synthetic sensor data, based on control signals sent to the input stimuli device and a configuration of the virtual sensor.

14. One or more non-transitory computer-readable media storing computer-executable instructions that, when executed by one or more processors of a system for automating testing of monitoring devices, cause the one or more processors to:

receive, at a testing controller, a firmware package, wherein the firmware package comprises a first firmware version;

receive, a testing package, wherein the testing package comprises:

a testing configuration; and one or more test recipes, wherein each test recipe comprises one or more specific tests; and start execution of a test recipe, wherein the execution comprises:

determining, by a device interface module, a second firmware version being run on the target device;

verifying that the first firmware version and the second firmware version are the same;

adding, to the test configuration, the target device;

generating, by the input stimuli device, testing stimuli, the testing stimuli comprising one or more of a mechanical, electrical and electromagnetic signal, simulating operation of an equipment the target device is configured to monitor;

collecting, by the reference sensor, reference data resulting from the generated testing stimuli;

collecting, by a testing sensor, testing data resulting from the generated testing stimuli;

performing a comparison between the reference data and the testing data;

generating a status report corresponding to the comparison;

returning the firmware package with the generated status report;

controlling the input stimuli, simulating operations of the equipment;

determining failures of the equipment, based on the simulating; and a target device controller, remotely modifying the firmware of the target device, comprising providing operational instructions to the target device, based on the execution of the test recipes, wherein the reference sensor comprises a physical sensor co-located with the target device and configured to collect sensor data in response to mechanical, electrical or electromagnetic stimuli generated by the input stimuli device.

15. The one or more non-transitory computer-readable media of claim 14, wherein the comparison is based on one or more ranges of values corresponding to valid responses to specific tests in the test recipe.

16. The one or more non-transitory computer-readable media of claim 15, wherein a comparison that falls outside of the one or more range of values generates a failure status report, and wherein a failure status report comprises an indication of the specific test that failed.

17. The one or more non-transitory computer-readable media of claim 14, wherein the input stimuli device comprises a shaker, oscillator, frequency analyzer, focus analyzer, power generator, or signal generator.

18. The one or more non-transitory computer-readable media of claim 14, wherein the reference sensor comprises a virtual sensor and wherein the virtual sensor is configured to simulate operation of a virtual target device that is the same model as the target device.

19. The one or more non-transitory computer-readable media of claim 14, wherein the input stimuli device comprises a physical device configured to generate mechanical vibrations or electrical signals applied to the target device.

20. The one or more non-transitory computer-readable media of claim 14, wherein the one or more processors are further configured to: with the testing controller condition an initiation of execution of a test recipe by verifying a firmware version running on the target device matching a first firmware version of the received firmware package.

* * * * *